United States Patent Office 3,423,176
Patented Jan. 21, 1969

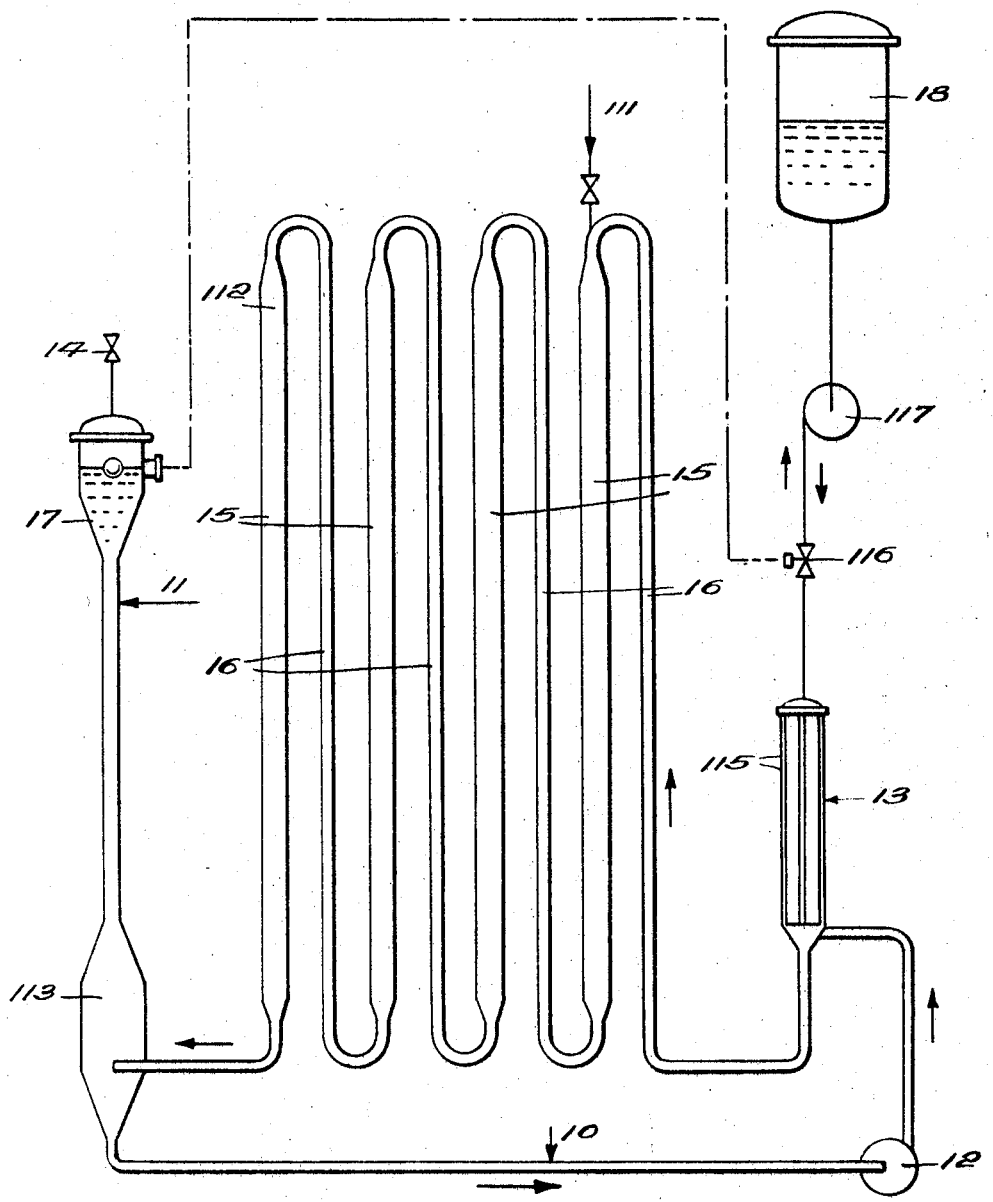

3,423,176
PROCESS FOR CARRYING OUT CATALYTIC HYDROGENATION REACTIONS IN THE PRESENCE OF SUSPENSION CATALYSTS
Gerhard Kabisch, Rheinfelden, Baden, and Hans Herzog, Bensheim-Auerbach, Germany, assignors to Deutsche Gold- und Silber-Scheideanstalt vormals Roessler, Frankfurt am Main, Germany
Filed Dec. 2, 1966, Ser. No. 598,716
Claims priority, application Germany, Dec. 4, 1965, D 48,829
U.S. Cl. 23—207     10 Claims
Int. Cl. C01b 15/02; B01j 9/00

ABSTRACT OF THE DISCLOSURE

A catalytic hydrogenation process in which the components of the heterogeneous system essentially composed of a mixture of hydrogenation gas, a liquid comprising the substance to be hydrogenated and a solid suspension catalyst are passed concurrently through an elongated reaction space and the mixture is passed through such space at velocities of at least 0.5 m./sec., the reaction space preferably being sufficiently long that the hydrogen in such system has reacted completely at the end thereof.

---

Reference is made to our copending application entitled "Separation of Suspended Unsupported Noble Metal Catalysts From Hydrogenated Liquids," Ser. No. 598,591, filed of an even date herewith which contains related disclosures.

The present invention relates to a process for carrying out catalytic hydrogenation reactions in the presence of suspension catalysts, especially at temperatures below 150° C. and pressures below 15 atmospheres gauge pressure.

The reaction in hydrogenations with suspension catalysts in general occurs in a three phase system. Usually the phases are formed of the solid suspension catalyst, the liquid substances to be hydrogenated or a solution of the substances to be hydrogenated and the hydrogen or hydrogen containing gas. In order to increase the velocity of the hydrogenation an as intimate as possible mixing of the components of the three phase system is always sought after. In addition, the intensity and velocity of the hydrogenation of a substance depends upon the size of the boundary surfaces, the period the hydrogenating gas remains in the system, the kind and type of catalyst, the temperature and pressure of the system and similar considerations. The embodiment of a low pressure hydrogenation described in P. B. Report 4336 is carried out at 3 atmospheres gauge pressure in pressure vessels in which the catalyst is maintained in suspension by intensive stirring. In order to achieve large phase boundary surfaces, the hydrogen is introduced through ceramic candles, a portion of which at times is used to introduce the hydrogenating gas and the other portion for filtering the hydrogenated liquid. Clogging of the ceramic candles and therefore a decrease in filtering efficiencies during long periods of operation cannot be prevented in the process described. In addition, the hydrogen introduced is not used quantitatively and a portion of the catalyst is withdrawn from the reaction by settling on the walls of the reaction vessels.

A process has also become known in British Patent No. 718,307 in which the apparatus operates on the airlift principle and the catalyst is maintained in suspension by the hydrogen introduced into the bottom of the vessel through distribution candles. The process also is attended with considerable difficulties as it is necessary to recycle the hydrogen in order to obtain any mixing of the components, even though it be insufficient. Despite this, quantitative use of the hydrogen is not attained as a portion of the recycled gas is always blown off as otherwise the foreign gas concentration in the recycled gas would increase to an undesired extent in the course of time. In addition, this process is limited to the use of special suspension catalysts, in which certain narrow limits as to densities and viscosities of the solutions to be hydrogenated must be maintained. Furthermore, only such catalysts can be employed which can be mechanically suspended and maintained in suspension by the hydrogen.

According to the invention it was found that the disadvantages of the known processes can be effectively avoided when the components of the heterogeneous system consisting essentially of a mixture of hydrogenating gas, the substance to be hydrogenated, as such, when liquid, or in solution and the suspension catalyst are passed concurrently through the reaction space and the mixture is passed through said reaction space at velocities of at least 0.5 m./sec., preferably, at least 0.7 m./sec., especially when using reaction temperatures below 150° C. and gauge pressures below 15 atmospheres. Elongated reaction spaces, especially tubes or tube systems, are used with special advantage. The length of the reaction spaces is so selected that the mechanically distributed hydrogen has completely reacted by the time the end of the tube is reached.

According to an especially advantageous embodiment of the process according to the invention, such process is carried out in a tube system consisting of a series of vertically disposed tubes connected to each other by elbows, the tubes in which the reaction mixture passes upwardly being of smaller inner cross-section than those in which the reaction mixture passes downwardly.

Expediently the velocity of the reaction mixture passing downwardly is between 0.7 and 1.5 m./sec. and that of the mixture passing upwardly is between 1.5 and 3 m./sec.

Suspension catalysts of all types can be employed in the process according to the invention. However, it is especially suited for use with unsupported noble metal suspension catalysts such as palladium black.

The forced passage of the heterogeneous reaction mixture through the reaction space is effected with the aid of one or more pumps. The hydrogen or hydrogen containing gas is introduced in the neighborhood of the pump, especially on the pressure side. When the substance to be hydrogenated is gaseous its introduction is effected analogously to that of the hydrogen or hydrogen containing gas.

The process according to the invention is especially advantageously carried out continuously with a recycle in the cycle of which a filter is arranged to permit withdrawal of the hydrated product in catalyst free form. In order to obtain a good recycling and filtering efficiency it is necessary to arrange the filter aggregate in a by-pass or to be certain that the liquid-solids mixture passes downwardly through the filter. When the filter aggregate is placed between the pump and the actual reaction space, the hydrogenating gas expediently is introduced, as seen from the pump, behind the filter aggregate.

The accompanying drawing diagrammatically shows an apparatus suitable for carrying out the process according to the invention.

In such drawing, separating vessel 17 is provided with an inlet conduit 11 and a pressure retaining valve 14. One side of the separating vessel 17 is connected with pump 12 and on its other side with the tube system formed by tubes 15 and 16, which form the actual reaction space for the hydrogenation. The filter aggregate 13 provided with filters 115 is in a by-pass. The filter aggregate is connected over valve 116 and pump 117 to the overhead tank 18 which can take up the filtered and hydrogenated solution. Inlet 10 is provided for the introduction of the catalyst and a separator 113 for inert gas is provided at the lower end of separating vessel 17.

A hydrogenation can be effected in the apparatus described in the following manner:

Fresh liquid to be hydrogenated is introduced into the apparatus through inlet 11 to fill such apparatus therewith and to replace the quantity of hydrated product withdrawn through filter aggregate 13 and is passed with the aid of pump 12 through the lower portion of the filter aggregate 13 into the actual tube system of tubes 15 and 16 which form the actual hydrogenation space. The length of the tube system and the velocity of flow of the liquid cause the formation of a pressure in filter aggregate 13 because of resistance to flow. This pressure can be increased by providing additional pressure at the head of separating vessel 17. A portion of the liquid, corresponding to the quantity introduced through inlet 11, is passed through filters 115, valve 116 and rotary pump 117 into the overhead tank 18 by the pressure prevailing in the lower portion of filter aggregate 13. When the filtering efficiency decreases, filters 115 can be rinsed periodically by having the back wash pump 117 turned on for a short period of time, for example, a few seconds, so as to force a small quantity of the already filtered liquid through the filter in reverse direction and thereby effect its cleaning. It is of advantage to use a filtration sysytem which is universally usable but especially suited for metallic noble metal catalysts which already has been described in U.S. application Ser. No. 598,591, filed of an even date herewith entitled "Separation of Suspended Unsupported Noble Metal Catalysts From Hydrogenated Liquids."

The suspension catalyst which is introduced into the apparatus at 10 can be reliably maintained in suspension by adjusting the velocity of flow to at least 0.5 m./sec. The introduction of the hydrogen is effected at 111, therefore expediently at a location where increased pressure prevails because of the pump action. The introduction of the hydrogen can be effected without the aid of distributors such as nozzles or frits so that clogging of these most susceptible parts does not occur. At a velocity of flow of at least 0.5 m./sec., the velocity of the flow of the liquid is greater in those parts of the apparatus where the reaction mixture flows downwardly than the velocity of the rising gas bubbles. As a consequence, the hydrogen is passed concurrently with the liquid and the suspension catalyst and is quantitatively consumed in the hydrogenation so that at the end of the reaction system, for example, at the location of about 112, hydrogen bubbles can no longer be recognized. When hydrogenating gases with a high inert gas content are used, the inert gas is separated off in separating vessel 113 and leaves the apparatus over valve 14 which if required can be constructed as a pressure valve.

As can be seen from the drawing the cross-section of the tubes is different depending upon the direction of flow of the reaction mixture therethrough so that sedimentation of the suspension catalyst is effectively avoided in the portions of the apparatus where the mixture flows upwardly.

The process according to the invention can be carried out continuously or discontinuously. With regard to the substances to be hydrogenated it is extraordinarily elastic as these can be gaseous, liquid or solid (dissolved). Insofar as gaseous substances are to be hydrogenated, the hydrogenated products as a rule also are gaseous. In such case an inert liquid is used for the liquid recycle and the gas to be hydrogenated is introduced into the system expediently together with the hydrogen. The gaseous reaction product is then separated from the liquid at the end of the reaction space (tube or tube system). In the hydrogenation of substances which are solid at the temperatures employed or which become solid during the hydrogenation, the hydrogenation is carried out in inert liquids in which the solid substances are either suspended or dissolved. The suspension catalyst employed according to the invention can be supported on a carrier or be carrierless. Aside from noble metal catalysts, Raney catalysts can also be employed in the process according to the invention. In view of the extraordinarily intimate mixture of all phases of the components present the catalyst can develop its full activity even at low concentrations and retains such high activity over a long period of life. As a consequence the catalyst concentrations in the hydrogenation recycle can be very low, for instance, between 0.3 and 3.0 g./l. The catalyst content of the apparatus can be held low even in large apparatus operating on a commercial scale, which just in the case of noble metal catalysts for the first time renders an economical operation possible.

Further advantages of the process according to the invention are, among others, the high velocity of hydrogenation which renders it possible that the substance to be hydrogenated need only remain in the system for a short time and the substantially quantitative consumption of the hydrogen even in industrial plants. The introduction of the hydrogen at locations where the high pressures prevail provides a maximum hydrogen concentration whereby the hydrogen transfer is facilitated to a great extent. The hydrogen then reacts to completion in the system in the measure that the pressure drops over the length of the reaction space. It furthermore is of advantage that the hydrogen may be introduced into the system without the aid of special distributing arrangements, such as, nozzles, frits or sieves which usually are susceptible to trouble. The use of a meandering tube system in which the vertical tube sections are joined by curved tube sections leads to the formation of a strong turbulence, particularly in the curved sections, which effect a very intensive breaking up of the gas bubbles into smaller bubbles and also in some instances also a comminution of the catalyst particles. These phenomena together with the generally good mixture of the phases also hinder an undesired coagulation of the catalyst particles. It also may be mentioned that heating and cooling measures can be provided for the tubular reaction spaces without special costs so that the supply or removal of heat does not cause any difficulties.

The process according to the invention advantageously can be used as a step in the production of hydrogen peroxide by the cyclic process involving alternating reduction and oxidation of the anthraquinone compounds.

The process according to the invention also has the advantages that with it the hydrogenation of styrene oxide can be carried out at room temperature without application of pressure to give practically quantitative yields whereas in the previously known processes, for example, that according to U.S. Patents No. 1,787,205 and 2,524,016, either high temperatures or high pressures are required.

The following examples will serve further to illustrate the invention.

EXAMPLE 1

Hydrogenation of styrene oxide

An apparatus according to the drawing was used in which the tube system 15/16 had a total length of 36 meters. The diameter of tubes 15 was double that of tubes 16. The capacity of tube system was 105 liters and that of the entire apparatus 190 liters. The pump 12 provided a recycle of 12.7 m.³/h. The velocity in tubes 15 was 0.7 m./sec. and in tubes 16 was 2.8 m./sec. The apparatus was filled with 190 liters of styrene oxide ($D_4^{20}=1.056$). The required 50 g. of palladium black were stirred into a little styrene oxide and introduced at 10. They were uniformly suspended in the recycling styrene oxide within a few minutes. The actual hydrogenation was then begun by introducing 2 Nm.³ H₂/h. at 111 without the aid of a distributor. The exhaust gas, which was diluted with rinsing nitrogen, drawn off at 14 contained less than 1 liter of hydrogen per hour. After about 17 hours' operation about 90% of the styrene oxide had been hydrogenated. Thereafter the hydrogenation was carried out continuously in that 11.3 liters per hour of styrene oxide were introduced into the apparatus at 11, while a corresponding quantity of catalyst free liquid was withdrawn at 116. Every 3 hours a slurry of 1 g. of palladium black was introduced into the apparatus. After a catalyst concentration of 1 g. of Pd per liter of liquid was reached this concentration could be maintained constant by continuously removing a corresponding quantity of catalyst from the recycling hydrogenation liquid.

The crude product obtained was distilled under vacuum. After a small quantity of first runnings (styrene oxide which could be returned to the hydrogenation) pure β-phenylethyl alcohol ($D_4^{20}=1.022$; $n_D^{20}=1.5323$) distilled over. The yield based on H₂ or styrene oxide was almost quantitative.

EXAMPLE 2

The production of β-phenylethyl alcohol was repeated with the difference that a supported Pd suspension catalyst was employed instead of palladium black. The catalyst consisted of 2% of Pd deposited on active Al₂O₃ having an average particle size of 0.06 mm. as carrier. In order to attain the substantially quantitative consumption of 2 Nm.³ H₂/h. described in Example 1, the hydrogenation had to be started with 200 g. of catalyst and later run with an increased concentration of 5 g./liter of recycling hydrogenation liquid.

In order to hinder the shaft seals of recycling pump 12 from being ground out, the fresh styrene oxide to be hydrogenated was introduced directly ahead of the stuffing boxes of pump 12. The yield as in Example 1 was practically quantitative.

EXAMPLE 3

The apparatus described in Example 1 was used except that filter aggegrate 13 was not used as the hydrogenation was carried out batch wise. The apparatus was filled with 180 liters of cyclohexene in which 250 g. of Raney nickel were suspended. The quantity of hydrogen introduced was 1.8 Nm.³/h. which were almost quantatively taken up for about 22 hours. Every three passes, 50 g. of fresh Raney nickel had to be added to the charge. After 22 hours the quantity of hydrogen introduced was gradually reduced, the hydrogenation of the charge completed and the charge withdrawn from the apparatus and filtered to separate it from the Raney nickel catalyst.

EXAMPLE 4

The apparatus described in Example 1 was used in a step of a cyclic process for the production of hydrogen peroxide. 500 liters per hour of the working solution to be hydrogenated were introduced into the apparatus at 11. A mixture of 75 vol. percent gasoline with aromatic content obtained by Platforming and 25 vol. percent of trioctyl phosphate in which 130 g. of 2-ethylanthraquinone had previously been dissolved per liter was employed as the working solution. A palladium black concentration of 0.6 g. Pd/liter was maintained in the recycling hydrogenation liquid and 2.8 Nm.³ H₂/h. were introduced at 111. The hydrogen was quantitatively consumed in the tube system 15/16. This quantity correspond to a 46% hydrogenation of the 2-ethylhydroquinone.

500 liters/hr. of hydrogenated liquid flowed through filters 115 into the overhead tank 18 and from there over the oxidation apparatus and the extraction towers back to the hydrogenation apparatus at 11.

The hydrogenation temperature employed in Examples 1–4 was between 25 and 40° C.

We claim:

1. In a process for a catalytic hydrogenation employing a system essentially consisting of the hydrogenation gas, a liquid comprising the substance to be hydrogenated and a solid suspension hydrogenation catalyst, the improvement which comprises introducing the components of said mixture concurrently into a reaction space and passing said mixture through said reaction space at a velocity of at least 0.5 m./sec., said reaction space consisting of a plurality of upwardly directed elongated spaces of smaller diameter alternately connected in series with a plurality of downwardly directed elongated spaces of larger diameter, the components of the mixture being passed concurrently upwardly through the smaller diameter spaces and downwardly through the larger diameter spaces.

2. The process of claim 1 in which the velocity of the mixture passing through the reaction space is at least 0.7 m./sec.

3. The process of claim 1 in which an excess of the substance to be hydorgenated is provided in the hydrogenation system and the length of the reaction space is such that by the time the mixture reaches the end thereof the hydrogen supplied to the mixture has reacted completely.

4. The process of claim 1 in which the hydrogenation catalyst is an unsupported noble metal suspension catalyst.

5. The process of claim 1 in which the hydrogenation catalyst is palladium black.

6. The process of claim 1 in which the liquid comprising the substance to be hydrogenated and the suspension catalyst are recycled to the reaction space with the aid of a pump and the hydrogenation gas is introduced therein near to and on the pressure end of the pump.

7. The process of claim 1 in which said catalytic hydrogenation is the hydrogenation step in an anthraquinone process for the production of hydrogen peroxide.

8. The process of claim 1 in which the reaction space is formed by a plurality of adjacent vertical tubes connected in series by elbows alternately connecting the tops and bottoms thereof.

9. The process of claim 4 in which the velocity of the mixture flowing downwardly in the larger diameter tubes is 0.7 to 1.5 m./sec. and the velocity of the mixture flowing upwardly in the smaller diameter tubes is 1.5 to 3 m./sec.

10. An apparatus for the catalytic hydrogenation of a substance capable of hydrogenation in a heterogeneous system essentially composed of hydrogenation gas, a liquid comprising the substance to be hydrogenated and a solid suspension catalyst, comprising a hydrogenation chamber formed of a plurality of adjacent vertical tubes connected in series by elbows alternately connecting the tops and bottoms thereof, pump means for passing the mixture of the components of the hydrogenation system in concurrent flow through said hydrogenation chamber at a velocity of at least 0.5 m./sec., the cross-section of the tubes of the hydrogenation chamber in which the mixture flows downwardly is larger than that of the tubes in which the mixture flows upwardly, means for recycling the liquid comprising the substance to be hydrogenated and the hydrogenated product and the suspension catalyst leaving the end of the hydrogenation chamber to the beginning of the hydrogenation chamber including said aforementioned pump means, means for introducing the hydrogenation gas into the recycled liquid and suspension catalyst on the pressure side of said pump means, filter means connected to the recycling means adapted and arranged to filter off the suspension catalyst from a portion of the liquid being recycled and withdrawing said portion of the liquid from the cycle, and means for introducing fresh liquid containing the substance to be hydrogenated to the liquid being recycled to replace the liquid containing the substance to be hydrogenated and the hydrogenated product withdrawn through the filter means.

References Cited

UNITED STATES PATENTS

| | | | |
|---|---|---|---|
| 3,354,079 | 11/1967 | Van Driesen | 260—667 |
| 1,345,589 | 7/1920 | Ellis | 260—667 |
| 2,886,416 | 5/1959 | Cox et al. | 23—207 |

OSCAR R. VERTIZ, *Primary Examiner.*

HOKE S. MILLER, *Assistant Examiner.*

23—288; 252—472; 260—369, 667